US009494748B2

(12) United States Patent
Chen et al.

(10) Patent No.: US 9,494,748 B2
(45) Date of Patent: Nov. 15, 2016

(54) THROUGH TRANSMISSION PATH ON PHOTONIC CIRCUITS FOR OPTICAL ALIGNMENT

(71) Applicant: Acacia Communications, Inc., Maynard, MA (US)

(72) Inventors: Long Chen, Marlboro, NJ (US); Christopher Doerr, Middleton, NJ (US); Diedrik Vermeulen, Somerville, MA (US)

(73) Assignee: Acacia Communications, Inc., Maynard, MA (US)

( * ) Notice: Subject to any disclaimer, the term of this patent is extended or adjusted under 35 U.S.C. 154(b) by 0 days.

(21) Appl. No.: 14/991,816

(22) Filed: Jan. 8, 2016

(65) Prior Publication Data

US 2016/0202432 A1    Jul. 14, 2016

Related U.S. Application Data

(60) Provisional application No. 62/101,049, filed on Jan. 8, 2015.

(51) Int. Cl.
*G02B 6/12* (2006.01)
*G02B 6/42* (2006.01)
(Continued)

(52) U.S. Cl.
CPC ......... *G02B 6/4225* (2013.01); *G02B 6/12004* (2013.01); *G02B 6/1228* (2013.01); *G02B 6/2852* (2013.01); *G02B 6/30* (2013.01);
(Continued)

(58) Field of Classification Search
CPC ............ G02B 6/4225; G02B 6/12004; G02B 6/1228; G02B 6/2852; G02B 6/30; G02B 6/34; G02B 6/4227; G02B 2006/12109; G02B 2006/12126

USPC ........................................ 385/14, 88–92, 39
See application file for complete search history.

(56) References Cited

U.S. PATENT DOCUMENTS 4,900,118 A * 2/1990 Yanagawa ............ G02B 6/2817
156/158
6,654,523 B1 11/2003 Cole
(Continued)

FOREIGN PATENT DOCUMENTS

| JP | H10-123373 A | 5/1998 |
| WO | WO 2016/007860 A1 | 1/2016 |
| WO | WO 2016/007867 A2 | 1/2016 |

OTHER PUBLICATIONS

Barwicz et al., Assembly of Mechanically Compliant Interfaces between Optical Fibers and Nanophotonic Chips. The 64th Electronic Components and Technology Conference (ECIC 2014). Orlando, Florida. Presentation. May 27-30, 2014. 14 pages.
(Continued)

*Primary Examiner* — Ellen Kim
(74) *Attorney, Agent, or Firm* — Wolf, Greenfield & Sacks, P.C.

(57) ABSTRACT

A photonic integrated circuit (PIC) may be optically aligned to a plurality of optical components (e.g., an optical fiber array). Optical alignment may be facilitated by the use of an optical impedance element coupled between a first input/output (I/O) optical waveguide and a second I/O optical waveguide of the PIC. The optical impedance element me be configured to be transmissive during optical alignment and to be non-transmissive during the regular operation of the PIC.

21 Claims, 10 Drawing Sheets

(51) Int. Cl.
   *G02B 6/30* (2006.01)
   *G02B 6/28* (2006.01)
   *G02B 6/122* (2006.01)
   *G02B 6/34* (2006.01)

(52) U.S. Cl.
   CPC ............ *G02B6/34* (2013.01); *G02B 6/4227* (2013.01); *G02B 2006/12109* (2013.01); *G02B 2006/12126* (2013.01)

(56) References Cited

U.S. PATENT DOCUMENTS

| | | | |
|---|---|---|---|
| 6,856,735 B2 * | 2/2005 | Chang | G02B 6/12004 385/31 |
| 7,183,759 B1 | 2/2007 | Malendevich et al. | |
| 9,195,079 B2 | 11/2015 | Doerr et al. | |
| 2002/0110328 A1 * | 8/2002 | Bischel | G02B 6/4201 385/49 |
| 2002/0191901 A1 * | 12/2002 | Jensen | G02B 6/3588 385/24 |
| 2003/0169422 A1 | 9/2003 | Mukai | |
| 2005/0123306 A1 * | 6/2005 | Ilchenko | G02B 6/29395 398/161 |
| 2013/0209111 A1 * | 8/2013 | Kawashima | G02F 2/00 398/202 |
| 2015/0063747 A1 | 3/2015 | Chen et al. | |
| 2015/0295382 A1 * | 10/2015 | Digiovanni | G02B 6/036 359/341.33 |

OTHER PUBLICATIONS

International Search Report and Written Opinion mailed Jun. 27, 2016 for Application No. PCT/US2016/012754.

* cited by examiner

THROUGH TRANSMISSION PATH ON PHOTONIC CIRCUITS FOR OPTICAL ALIGNMENT

RELATED APPLICATIONS

This Application claims the benefit under 35 U.S.C. §119(e) of U.S. Provisional Patent Application Ser. No. 62/101,049, entitled "THROUGH TRANSMISSION PATH ON PHOTONIC CIRCUITS FOR OPTICAL ALIGNMENT" filed on Jan. 8, 2015, which is hereby incorporated herein by reference in its entirety.

BACKGROUND

1. Field

The present application relates to optical alignment of a photonic integrated circuit (PIC) to one or more optical components.

2. Related Art

PICs include input/output (I/O) optical waveguides configured to couple optical signals in and out of the PIC. Often optical fibers are coupled to the PIC to deliver optical signals to the I/O optical waveguides. The optical fibers can be edge-coupled to the PIC, or coupled to a surface of the PIC.

BRIEF SUMMARY

According to one aspect of the application, a photonic integrated circuit is provided, comprising a first optical waveguide and a second optical waveguide, the first optical waveguide having a first end adjacent a side of the photonic integrated circuit and the second optical waveguide having a second end adjacent the side of the photonic integrated circuit, the photonic integrated circuit further comprising a first tap coupler coupled to the first waveguide and a second tap coupler coupled to the second waveguide and wherein the first tap coupler is coupled to the second tap coupler by a waveguide having an optical impedance element.

According to one aspect of the application, a method for optically aligning a plurality of optical waveguides disposed on a photonic integrated circuit to a plurality of optical components is provided, the method comprising providing an alignment signal to a first optical waveguide of the plurality of optical waveguides with a first optical component of the plurality of optical components through a side of the photonic integrated circuit, providing the alignment signal from the first optical waveguide to a second optical waveguide of the plurality of optical waveguides via first and second tap couplers and an optical impedance element and providing the alignment signal to a second optical component of the plurality of optical components with the second optical waveguide of the plurality of optical waveguides through the side of the photonic integrated circuit.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

Figure 1:
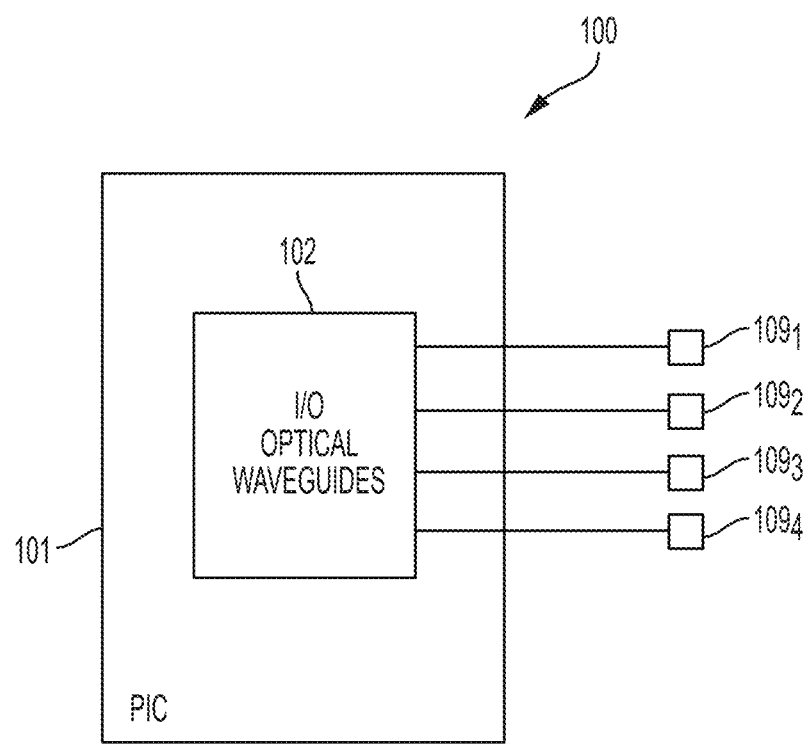
FIG. 1 is a block diagram illustrating a photonic integrated circuit (PIC) having a plurality of input/output (I/O) optical waveguides optically aligned to a plurality of optical components.

Applicant has appreciated that optically aligning a photonic integrated circuit (PIC) to an array of optical components (e.g., an optical fiber array) by using dedicated input/output (I/O) optical waveguides may lead to increased production costs. Dedicated I/O optical waveguides may require additional real estate on the PIC and/or on the package on which the PIC is disposed, thus increasing packaging costs. According to one aspect of the present application, optical alignment may be performed by using I/O optical waveguides that are also in use during the regular operation of the PIC, thus eliminating the need for dedicated I/O optical waveguides.

While the use of non-dedicated I/O optical waveguides for the purpose of optical alignment may be beneficial at least for the reasons described above, this approach may lead to PIC designs in which independent I/O optical waveguides may be mutually coupled. For example, an optical transceiver may be configured to achieve optical alignment by coupling an alignment signal in the PIC through the receive (RX) optical waveguide and by coupling the alignment signal out of the PIC through the transmit (TX) optical waveguide. In such a scenario, the RX optical waveguide may be coupled, at least in part, to the TX optical waveguide to provide an optical path for the alignment signal. However, having the RX optical waveguide coupled to the TX optical waveguide may be undesirable during the regular operation of the PIC (e.g., when the PIC is transmitting data through the TX optical waveguide and/or receiving data through the RX optical waveguide) as crosstalk between the RX optical waveguide and the TX optical waveguide may arise. Crosstalk may degrade the integrity of the data being transmitted and/or received.

Applicant has further appreciated that a PIC may be optically aligned to an array of optical components (e.g., a fiber array) without causing crosstalk between the various I/O optical waveguides of the PIC, by providing an optical path between at least two I/O optical waveguides, where the I/O optical waveguides are coupled by one or more optical impedance elements.

According to aspects of the present application, the optical impedance element may be configured to provide an optical path between the I/O optical waveguides, and to block optical signals once the plurality of I/O optical waveguides have been aligned to the plurality of optical components. Accordingly, crosstalk between the I/O optical waveguides may be suppressed during the regular operation of the PIC.

In some embodiments, the optical impedance elements may comprise one or more optical filters configured to be transparent, at least in part, to alignment signals and to be absorptive, at least in part, to all other types of signals. In such embodiments, alignment signals may have optical wavelengths selected from the passband of the optical filter and all other signals may have optical wavelengths selected from the stopband of the optical filter.

In other embodiments, the optical impedance elements may comprise one or more optical switches configured to be transmissive, at least in part, during the optical alignment procedure and to be non-transmissive, at least in part, during the regular operation of the PIC. Control signals may be used to determine the state of the optical switches.

In yet other embodiments, the optical impedance elements may comprise breakable optical waveguides configured to provide optical paths between two or more I/O optical waveguides for the purpose of optical alignment. The breakable optical waveguides may be disrupted once the optical alignment has been performed, thus interrupting the optical path between the two or more I/O optical waveguides.

The aspects and embodiments described above, as well as additional aspects and embodiments, are described further below. These aspects and/or embodiments may be used individually, all together, or in any combination of two or more, as the application is not limited in this respect.

FIG. 1 is a block diagram illustrating a PIC 101 having a plurality of I/O optical waveguides 102 optically aligned to a plurality of optical components $109_1$, $109_2$, $109_3$, and $109_4$. While block diagram 100 illustrates four optical components, any suitable number of optical components greater than one may be used. The various optical components may be optically aligned to a respective I/O optical waveguide of PIC 101. PIC 101 may comprise a silicon substrate in some embodiments. I/O optical waveguides 102 may have silicon cores in some embodiments.

In the present application, the I/O optical waveguides will be referred to as being "aligned", or "optically aligned", or "in optical alignment" to optical components, when, if a signal is transmitted from the I/O optical waveguide to the optical component, or vice versa, the coupling insertion loss is less than 10 dB. For example, the coupling insertion loss may be less than 10 dB in some embodiments, less than 5 dB in some embodiments, less than 3 dB in some embodiments, or less than 1 dB in some embodiments, or any other number within such ranges.

In some embodiments, PIC 101 may be configured to be edge-coupled or surface-coupled (e.g., through one or more grating couplers) to optical components $109_1 \ldots 109_4$. In some embodiments, each I/O optical waveguide of PIC 101 may be coupled to a respective optical component through the same side of PIC 101, such as a facet of PIC 101. In some embodiments, the I/O optical waveguides may be coupled to a plurality of optical couplers to facilitate coupling to the optical components. In some embodiments, the optical couplers may comprise intermediate waveguides.

In some embodiments, I/O optical waveguides 102 may be actively optically aligned to optical components $109_1 \ldots 109_4$. In other embodiments, I/O optical waveguides 102 may be passively optically aligned to optical components $109_1 \ldots 109_4$. The basic difference between the two approaches is that for the active alignment it may be necessary to adjust the position of the PIC relative to the optical components during the assembly and packaging process, while for the passive alignment it may not.

In some embodiments, optical components $109_1 \ldots 109_4$ may comprise an array of optical fibers. The optical fiber array may be coupled to the I/O optical waveguides of PIC 101 through an optical fiber assembly. The optical fiber assembly may comprise grooves configured to accommodate the optical fibers thereon. The grooves may be v-grooves in some embodiments. In some embodiments, optical components $109_1 \ldots 109_4$ may be part of a second PIC (not shown). For example, optical components $109_1 \ldots 109_4$ may represent I/O optical waveguides of the second PIC. The two PICs may be coupled to each other via optical fibers or via free space.

Figure 2:
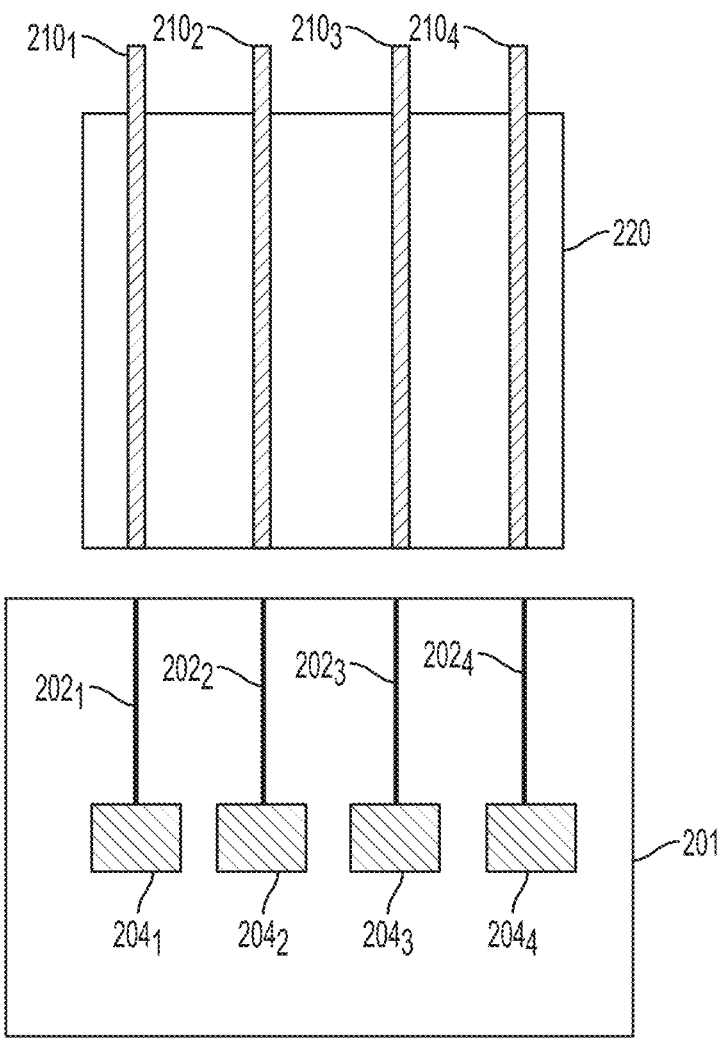
FIG. 2 is a top view of a device including a PIC comprising a plurality of I/O optical waveguides and a plurality of photodetectors.

FIG. 2 is a top view of a PIC 201 comprising a plurality of I/O optical waveguides $202_1$, $202_2$, $202_3$ and $202_4$ and a plurality of photodetectors $204_1$, $204_2$, $204_3$ and $204_4$. I/O optical waveguides $202_1 \ldots 202_4$ may serve as I/O optical waveguides 102 of FIG. 1. Optical fibers $210_1 \ldots 210_4$ may be disposed on optical fiber assembly 220. For example, optical fibers $210_1 \ldots 210_4$ may be disposed on respective grooves of optical fiber assembly 220. While FIG. 2 illustrates four I/O optical waveguides and four optical fibers, any suitable number of I/O optical waveguides and optical fibers greater than one may be used.

The two outermost I/O optical waveguides $202_1$ and $202_4$ may be used for the purpose of optically aligning all I/O optical waveguides $202_1 \ldots 202_4$ to optical fibers $210_1 \ldots 210_4$. Optical alignment may be achieved by coupling alignment signals to I/O optical waveguides $202_1$ and $202_4$ via optical fibers $210_1$ and $210_4$ and by detecting the alignment signals with photodetectors $204_1$ and $204_4$. The position of PIC 201 relative to optical fiber assembly 220 may be adjusted until the power detected by the photodetectors is maximized. By optically aligning the two outermost I/O optical waveguides $202_1$ and $202_4$ to the two outermost optical fibers $210_1$ and $210_4$, the inner waveguides $202_2$ and $202_3$ may be naturally aligned to optical fibers $210_2$ and $210_3$. However I/O optical waveguides other than the two outermost optical waveguides may be used for the purpose of optical alignment. For example, one outermost waveguide (such as waveguide $202_1$) and one non-outermost (or interior) waveguide (such as waveguide $202_3$) may be used for the purpose of optical alignment.

While providing means to optically align I/O optical waveguides to an optical fiber array, the configuration shown in FIG. 2 requires dedicated I/O optical waveguides and dedicated optical fibers. Using dedicated optical fibers and waveguides may increase production costs in some circumstances.

Figure 3:
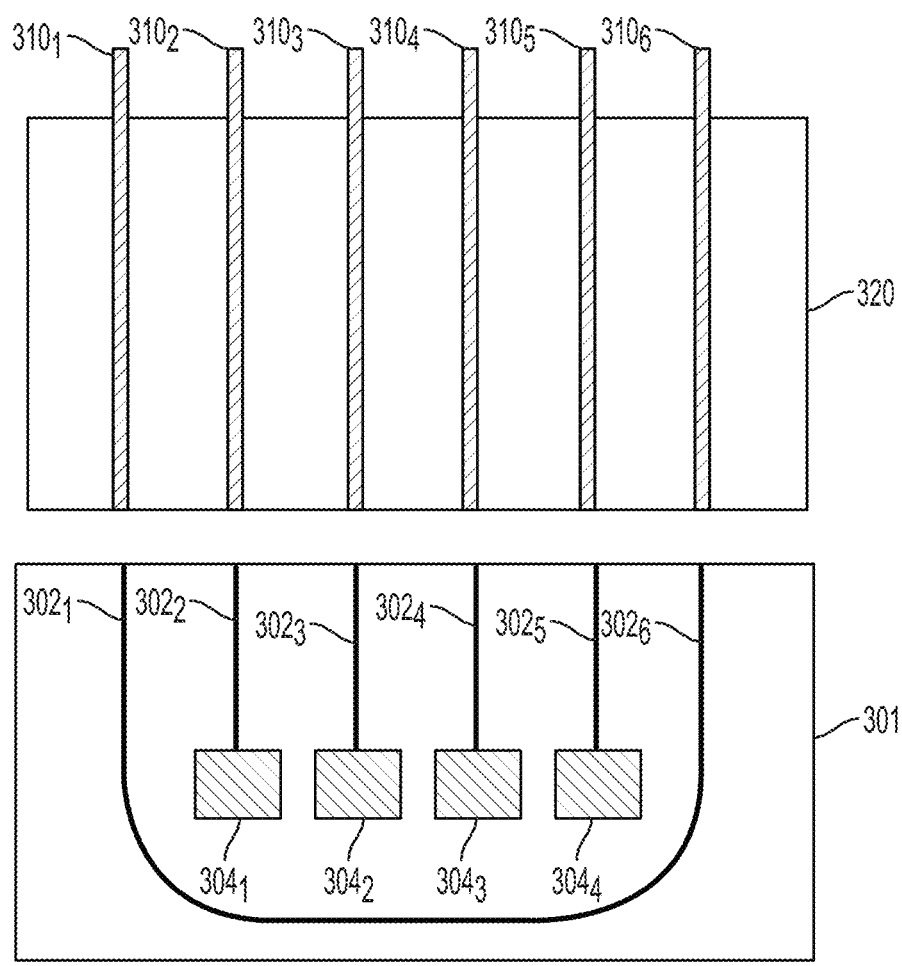
FIG. 3 is a top view of a device including a PIC comprising a plurality of I/O optical waveguides where the two outermost optical waveguides are connected.

FIG. 3 is a top view of a PIC 301 comprising a plurality of I/O optical waveguides $302_1$, $302_2$, $302_3$, $302_4$, $302_5$ and $302_6$, where I/O optical waveguides $302_1$ and $302_6$ may be used for the purpose of optical alignment. I/O optical waveguides $302_1$ and $302_6$ may be coupled back-to-back inside the PIC. Optical fibers $310_1 \ldots 310_6$ may be disposed on optical fiber assembly 320. For example, optical fibers $310_1 \ldots 310_6$ may be disposed on respective grooves of optical fiber assembly 320. Optical waveguides $302_2 \ldots 302_5$ may be coupled to optical components $304_1 \ldots 304_4$ respectively. Each of the optical components $304_1 \ldots 304_4$ may represent any suitable type of optical component, such as a photodetector, filter, modulator, switch, polarization splitter, polarization rotator, etc. While FIG. 3 illustrates six I/O optical waveguides and six optical fibers, any suitable number of I/O optical waveguides and optical fibers may be used.

The two outermost I/O optical waveguides $302_1$ and $302_6$ may be used for the purpose of optically aligning I/O optical waveguides $302_1 \ldots 302_6$ to optical fibers $310_1 \ldots 310_6$. Optical alignment may be achieved by coupling an alignment signal to I/O optical waveguides $302_1$ via optical waveguides $310_1$ and by receiving the alignment signals via I/O optical waveguide $302_6$ and optical fiber $310_6$. The position of PIC 301 relative to optical fiber assembly 320 may be adjusted until the power of the received alignment signal is maximized, which may be detected using a photodetector located to receive the signal of optical fiber $310_6$. For example, a photodetector may be positioned distal from the end of optical fiber $310_6$ which abuts the I/O optical waveguide $302_6$. The position of the PIC 301 relative to the optical fiber assembly 320 may be adjusted until the power of the received alignment signal achieves a desired threshold indicative of sufficient alignment.

By optically aligning the two outermost I/O optical waveguides $302_1$ and $302_6$ to the two outermost optical fibers $310_1$ and $310_6$, the inner waveguides $302_2$-$302_5$ may be naturally aligned to optical fibers $310_2$-$310_5$, respectively. However I/O optical waveguides other than the two outermost optical waveguides may be used for the purpose of optical alignment. For example, one outermost waveguide (such as waveguide $302_1$) and one interior waveguide (such as waveguide $302_5$) may be used for the purpose of optical alignment. Alternatively, two interior waveguides may be used.

While providing means to optically align I/O optical waveguides to an optical fiber array, the configuration shown in FIG. 3 requires dedicated I/O optical waveguides for the purposes of alignment. Using dedicated I/O optical waveguides for the purpose of alignment may increase production costs in some circumstances as additional space on the PIC 301 shown in FIG. 3 may be required.

Figure 4:
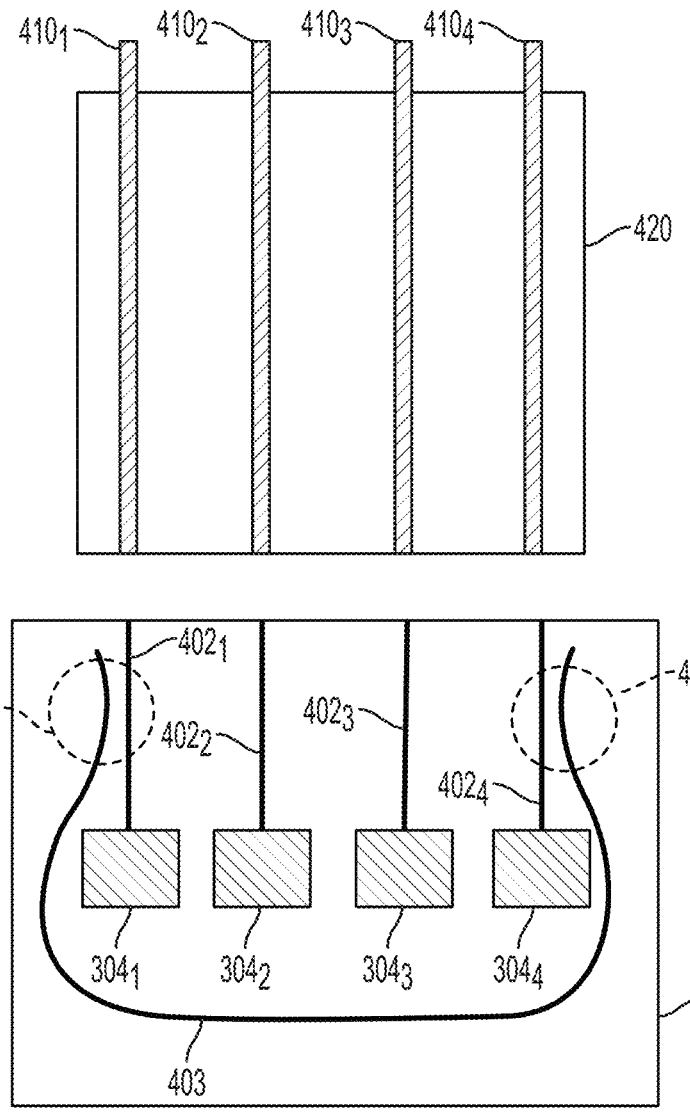
FIG. 4 is a top view of a device including a PIC comprising a plurality of I/O optical waveguides and two tap couplers coupled by an optical waveguide, according to a non-limiting embodiment of the present application.

FIG. 4 is a top view of a PIC 401 comprising a plurality of I/O optical waveguides $402_1$, $402_2$, $402_3$ and $402_4$, tap couplers 405 and 407 and optical waveguide 403, according to a non-limiting embodiment of the present application. I/O optical waveguides $402_1 \ldots 402_4$ may serve as I/O optical waveguides 102 of FIG. 1. Optical fibers $410_1$, $410_2$, $410_3$ and $410_4$ may serve as the optical components $109_1 \ldots 109_4$ of FIG. 1. Optical fibers $410_1 \ldots 410_4$ may be disposed on optical fiber assembly 420 in some embodiments. For example, optical fibers $410_1 \ldots 410_4$ may be disposed on respective grooves of optical fiber assembly 420. Optical waveguides $402_1$- $\ldots 302_4$ may be coupled to optical components $304_1 \ldots 304_4$ respectively. Each of the optical components $304_1 \ldots 304_4$ may represent any suitable type of optical component, such as a photodetector, filter, modulator, switch, polarization splitter, polarization rotator, etc. While the non-limiting embodiment shown in FIG. 4 illustrates four I/O optical waveguides and four optical fibers, the application is not limited in this respect and any suitable number of I/O optical waveguides and optical fibers may be used.

In the non-limiting embodiment shown in FIG. 4, I/O optical waveguide $402_1$ may be coupled to tap coupler 405. Tap coupler 405 may be a directional coupler configured to couple an optical power to waveguide 403 that is between 1% and 10% of the optical power received by I/O optical waveguide $402_1$, and/or may couple a different polarization. The optical signal received by waveguide 403 may be coupled to tap coupler 407. Tap coupler 407 may be a directional coupler configured to couple an optical power to waveguide $402_4$ that is between 1% and 10% of the optical power received by waveguide 403, and/or may couple a different polarization. The signal received by I/O optical waveguide $402_4$ may be provided to optical fiber $410_4$. The signal received by optical fiber $410_4$ may be used to monitor the status of the optical alignment. In some embodiments, the position of PIC 401 relative to optical fiber assembly 420 may be adjusted until the power of the signal received by optical fiber $410_4$ (as detected in the manner described previously in connection with FIG. 3, or in any other suitable manner) is maximized, or otherwise achieves a desired threshold indicative of sufficient alignment. In some embodiments, by optically aligning the two outermost I/O optical waveguides $402_1$ and $402_4$ to the two outermost optical fibers $410_1$ and $410_4$, the inner waveguides $402_2$ and $402_3$ may be naturally self-aligned to optical fibers $410_2$ and $410_3$, respectively. However the application is not limited in this respect, and I/O optical waveguides other than the two outermost optical waveguides may be used for the purpose of optical alignment. In some embodiments one outermost waveguide (such as waveguide $402_1$) and one interior waveguide (such as waveguide $402_3$) may be used for the purpose of optical alignment. In some embodiments, two interior waveguides may be used.

The waveguide 403 may be considered a feedthrough optical waveguide in that it is configured to direct a signal received by the PIC back out of the PIC. Further examples of feedthrough optical waveguides are described with respect to other embodiments herein.

The non-limiting embodiment shown in FIG. 4 may suffer from crosstalk that may arise between I/O optical waveguides $402_1$ and $402_4$ during the regular operation of PIC 401. Accordingly, aspects of the present application provide apparatus and methods for reducing (including eliminating) such crosstalk.

Figure 5:
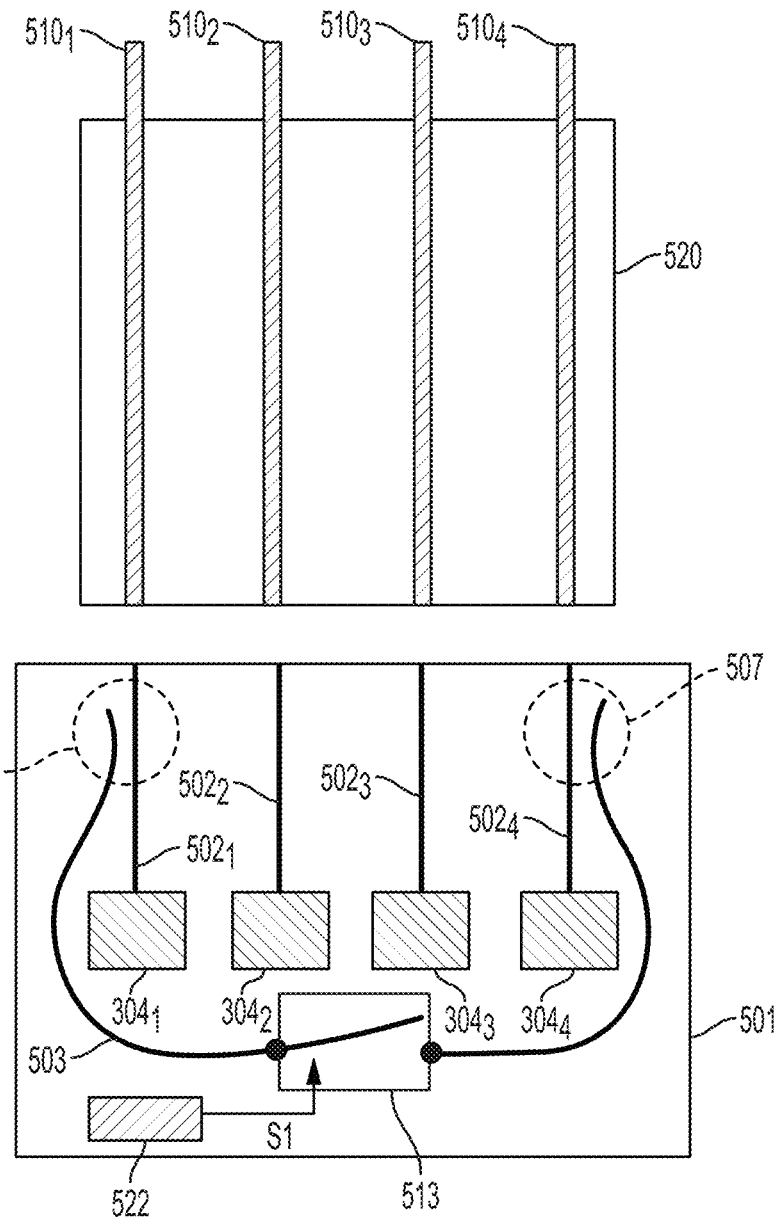
FIG. 5 is a top view of a device including a PIC comprising a plurality of I/O optical waveguides and two tap couplers coupled by an optical waveguide having an optical switch, according to a non-limiting embodiment of the present application.

FIG. 5 is a top view of a PIC 501 comprising a plurality of I/O optical waveguides $502_1$, $502_2$, $502_3$ and $502_4$, tap couplers 505 and 507, an optical waveguide 503 and an optical switch 513, according to a non-limiting embodiment of the present application. I/O optical waveguides $502_1 \ldots 502_4$ may serve as I/O optical waveguides 102 of FIG. 1. Optical fibers $510_1$, $510_2$, $510_3$ and $510_4$ may serve as the optical components $109_1 \ldots 109_4$ of FIG. 1. Optical fibers $510_1 \ldots 510_4$ may be disposed on optical fiber assembly 520 in some embodiments. For example, optical fibers $510_1 \ldots 510_4$ may be disposed on respective grooves of optical fiber assembly 520. Optical waveguides $502_1 \ldots 502_4$ may be coupled to optical components $304_1 \ldots 304_4$ respectively. Each of the optical components $304_1 \ldots 304_4$ may represent any suitable type of optical component, such as a photodetector, filter, modulator, switch, polarization splitter, polarization rotator, etc. While the non-limiting embodiment shown in FIG. 5 illustrates four I/O optical waveguides and four optical fibers, the application is not limited in this respect and any suitable number of I/O optical waveguides and optical fibers may be used.

In the non-limiting embodiment shown in FIG. 5, an alignment signal may be provided to I/O optical waveguide $502_1$ by optical fiber $510_1$. I/O optical waveguide $502_1$ may be coupled to tap coupler 505. Tap coupler 505 may be a directional coupler configured to couple an optical power to waveguide 503 that is between 1% and 10% of the optical power received by I/O optical waveguide $502_1$, and/or may couple a different polarization. The optical signal received by waveguide 503 may be coupled to optical switch 513, and/or may couple a different polarization. Optical switch may be configured to provide low optical loss (e.g., less than 6 dB, less than 3 dB, less than 2 dB, less than 1 dB, or any value or range of values within such ranges) during optical alignment, and high optical loss (e.g., more than 20 dB, more than 30 dB, more than 40 dB, more than 60 dB, between 20 dB and 100 dB, between 30 dB and 70 dB or any value or range of values within such ranges) during the regular operation (sometimes referred to herein as an "operational mode") of PIC 501. In some embodiments, optical switch 513 may comprise a variable optical attenuator. In some embodiments, optical switch 513 may comprise a Mach-Zehnder interferometer with thermo-optic phase shifters. In some embodiments, optical switch 513 may comprise a Mach-Zehnder interferometer with electro-optic phase shifters. In some embodiments, optical switch 513 may comprise an optical resonator. However, any suitable type of optical switch configured to provide low optical loss during optical alignment and high optical loss during the regular operation of PIC 501 may be employed.

During optical alignment, optical switch 513 may exhibit low optical loss and the signal coupled to optical waveguide 503 may be coupled to tap coupler 507. Tap coupler 507 may be a directional coupler configured to couple an optical power to waveguide $502_4$ that is between 1% and 10% of the optical power received by waveguide 503, and/or may couple a different polarization. The signal received by I/O optical waveguide $502_4$ may be provided to optical fiber $510_4$. The signal received by optical fiber $510_4$ may be used to monitor the status of the optical alignment. In some embodiments, the position of PIC 501 relative to optical fiber assembly 520 may be adjusted until the power of the signal received by optical fiber $510_4$ (as detected in the manner described previously in connection with FIG. 3, or in any other suitable manner) is maximized. In some embodiments, by optically aligning the two outermost I/O optical waveguides $502_1$ and $502_4$ to the two outermost optical fibers $510_1$ and $510_4$, the inner waveguides $502_2$ and $502_3$ may be naturally self-aligned to optical fibers $510_2$ and $510_3$. However the application is not limited in this respect, and I/O optical waveguides other than the two outermost optical waveguides may be used for the purpose of optical alignment. In some embodiments one outermost waveguide (such as waveguide $502_1$) and one non-outermost waveguide (such as waveguide $502_3$) may be used for the purpose of optical alignment. In some embodiments, two interior waveguides may be used.

The non-limiting embodiment shown in FIG. 5 may provide means to optically align I/O optical waveguides to an optical fiber array while minimizing crosstalk between I/O optical waveguides during the regular operation of PIC 501. As a drawback, the non-limiting embodiment shown in FIG. 5 may require circuitry to control the status of optical switch 513, that may require additional development costs and/or lead to additional power consumption. For example, control circuit 522 may be provided and may provide a control signal S1 to control operation of the switch.

Figure 6B:
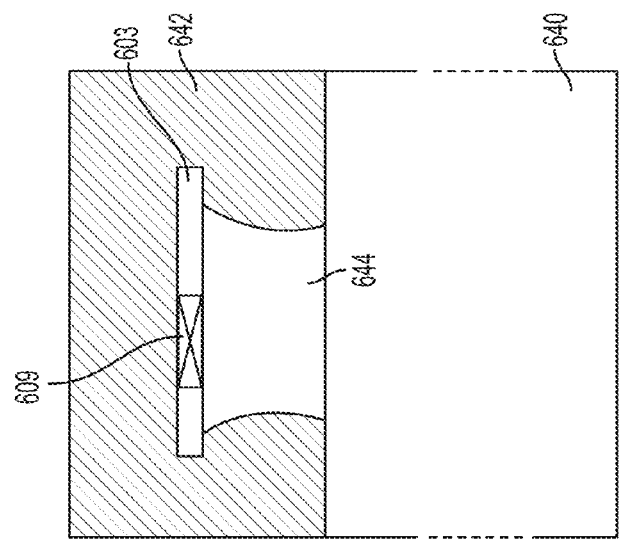
FIG. 6B is a side view of the PIC illustrated in FIG. 6A, according to a non-limiting embodiment of the present application.
Figure 6A:
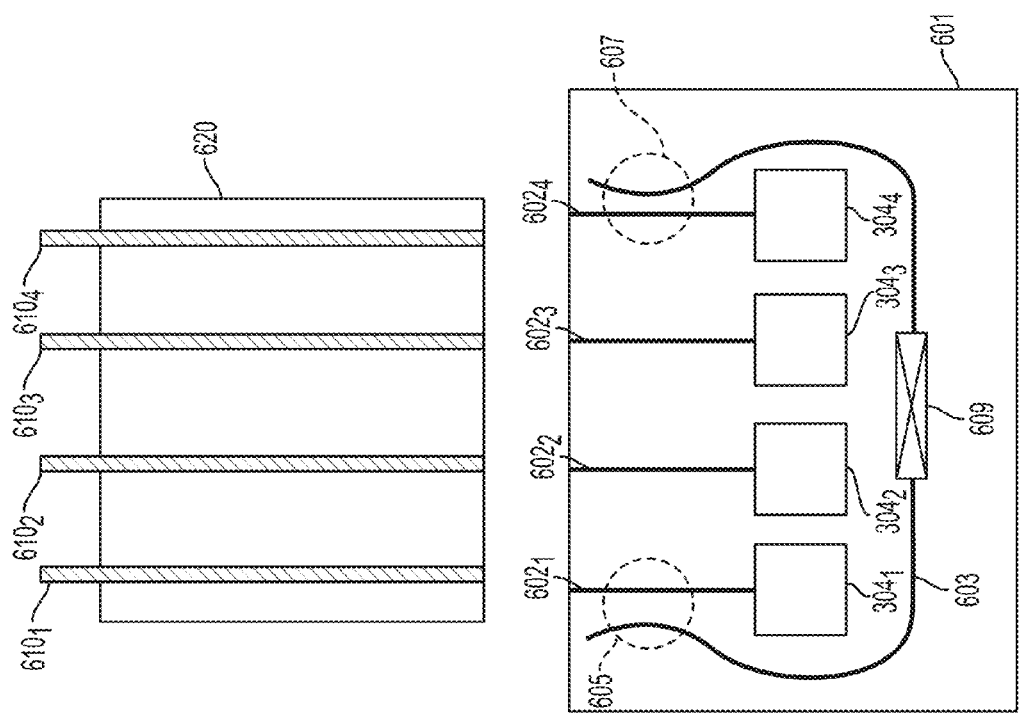
FIG. 6A is a top view of a device including a PIC comprising a plurality of I/O optical waveguides and two tap couplers coupled by a breakable optical waveguide, according to a non-limiting embodiment of the present application.

In some embodiments, a breakable optical waveguide may be used in lieu of optical switch 513 to provide high optical loss during the regular operation of PIC 501. FIG. 6A is a top view of a PIC 601 comprising a plurality of optical waveguides $602_1$, $602_2$, $602_3$ and $602_4$, tap couplers 605 and 607, and optical waveguide 603, according to a non-limiting embodiment of the present application. Optical waveguides $602_1$ . . . $602_4$ may be coupled to optical components $304_1$ . . . $304_4$ respectively. Each of the optical components $304_1$ . . . $304_4$ may represent any suitable type of optical component, such as a photodetector, filter, modulator, switch, polarization splitter, polarization rotator, etc. Optical waveguide 603 may be breakable in some embodiments. The non-limiting embodiment shown in FIG. 6A may comprise optical fibers $610_1$, $610_2$, $610_3$ and $610_4$ disposed on optical fiber assembly 620. As in the embodiment of FIG. 5, an alignment signal may be coupled by optical fiber $610_1$ to I/O optical waveguide $602_1$, to tap coupler 605 and to optical waveguide 603. Optical waveguide 603 may be coupled to tap coupler 607, which may be coupled to I/O optical waveguide $602_4$. The signal received by I/O optical waveguide $602_4$ may be provided to optical fiber $610_4$. The signal received by optical fiber $610_4$ may be used to monitor the status of the optical alignment.

In some embodiments, optical waveguide 603 may be disrupted once optical alignment has been achieved. Optical waveguide 603 may comprise a breakable region 609. FIG. 6B is a side view of PIC 601, according to a non-limiting embodiment of the present application. PIC 601 may comprise a substrate 640 and a cladding 642. Cladding 642 may comprise silicon dioxide in some embodiments. In some embodiments, the bottom cladding may be etched in a region 644 located in correspondence to optical waveguide 603. A portion of the substrate may also be removed. The cladding may be etched with an isotropic etching process. In some embodiments, region 644 may comprise air after the etching has been performed. In some embodiments, breakable region 609, located in correspondence to region 644, may be disrupted through the application of mechanical pressure. Mechanical pressure may be applied through the top cladding. For example, a probe, pick, tweezers, or other implement may be forced against the cladding 642 above the region 644, causing the cladding and the optical waveguide 603 to collapse into the region 644. That is, the cladding 642 and optical waveguide 603 may be broken, may fracture, may be damaged, and/or made discontinuous above the region 644. As a result, after the application of a mechanical pressure, the optical path associated with waveguide 603 may be interrupted. In some embodiments, the interruption may be permanent. The interruption may cause an optical loss that is greater than 20 dB in some embodiments, greater than 30 dB in some embodiments, greater than 40 dB in some embodiments, greater than 60 dB in some embodiments, between 20 dB and 100 dB, between 30 dB and 70 dB or any value or range of values within such ranges.

In other embodiments, interruption of optical waveguide 603 may be performed by disposing an absorbing material on top of cladding 642. The absorbing material may comprise absorbing epoxy, aluminum, copper or other metals, silicon or underfill. In some embodiments, optical waveguide 603 may be tapered in correspondence to the absorbing material to cause mode expansion. The expanded mode may overlap, at least in part, with the absorbing material, thus experiencing optical loss. In some embodiments, a trench may be formed in the cladding in correspondence to optical waveguide 603 and the absorbing material may be deposited in the trench. In this way an optical mode propagating along optical waveguide 603 may have an overlap with the absorbing material and consequently may experience optical loss.

Figure 7:
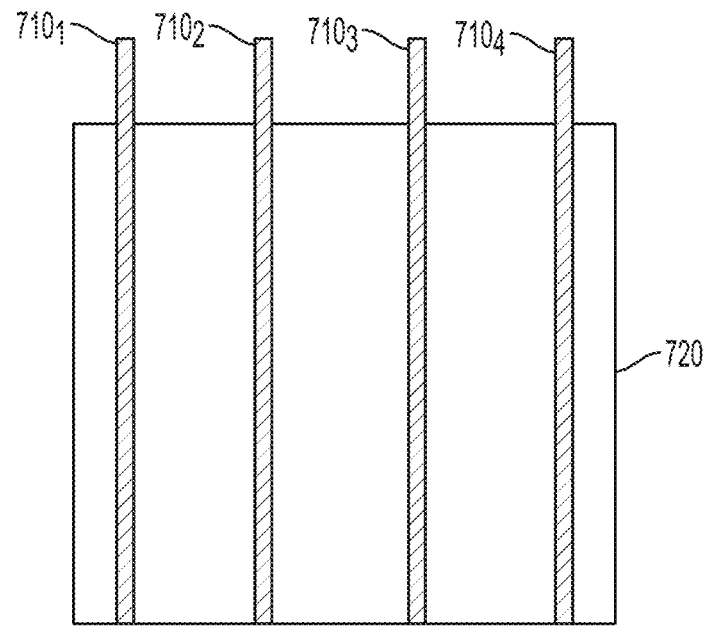
FIG. 7 is a top view of a device including a PIC comprising a plurality of I/O optical waveguides and two tap couplers coupled by an optical waveguide having an optical filter, according to a non-limiting embodiment of the present application.
Figure 7:
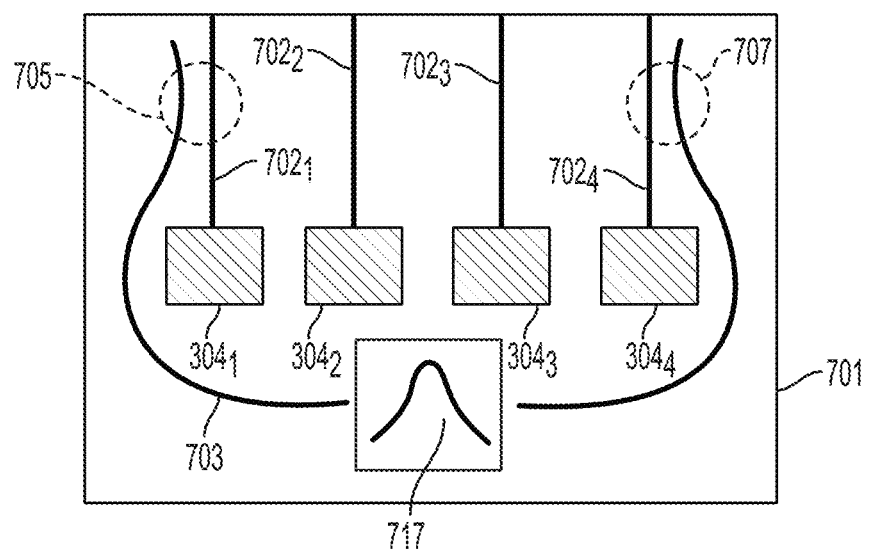

In some embodiments, crosstalk between I/O optical waveguides during the regular operation of the PIC may be suppressed by blocking the optical wavelength used for optical alignment. FIG. 7 is a top view of a PIC 701 comprising a plurality of I/O optical waveguides $702_1$, $702_2$, $702_3$ and $702_4$, tap couplers 705 and 707, an optical waveguide 703 and an optical filter 717, according to a non-limiting embodiment of the present application. I/O optical waveguides $702_1 \ldots 702_4$ may serve as I/O optical waveguides 102 of FIG. 1. Optical fibers $710_1$, $710_2$, $710_3$ and $710_4$ may serve as the optical components $109_1 \ldots 109_4$ of FIG. 1. Optical fibers $710_1 \ldots 710_4$ may be disposed on optical fiber assembly 720 in some embodiments. For example, optical fibers $710_1 \ldots 710_4$ may be disposed on respective grooves of optical fiber assembly 720. Optical waveguides $702_1 \ldots 702_4$ may be coupled to optical components $304_1 \ldots 304_4$ respectively. Each of the optical components $304_1 \ldots 304_4$ may represent any suitable type of optical component, such as a photodetector, filter, modulator, switch, polarization splitter, polarization rotator, etc. While the non-limiting embodiment shown in FIG. 7 illustrates four I/O optical waveguides and four optical fibers, the application is not limited in this respect and any suitable number of I/O optical waveguides and optical fibers may be used.

In the non-limiting embodiment shown in FIG. 7, an alignment signal may be provided to I/O optical waveguide $702_1$ by optical fiber $710_1$. The alignment signal may have an optical wavelength $\lambda_1$. I/O optical waveguide $702_1$ may be coupled to tap coupler 705. Tap coupler 705 may be a directional coupler configured to couple an optical power to waveguide 703 that is between 1% and 10% of the optical power received by I/O optical waveguide $702_1$, and/or may couple a different polarization. The optical signal received by waveguide 703 may be coupled to optical filter 717. Optical filter 717 may be configured to provide low optical loss (e.g. less than 6 dB, less than 3 dB, less than 2 dB, less than 1 dB, or any value or range of values within such ranges) at $\lambda_1$ and high optical loss (e.g., more than 20 dB, more than 30 dB, more than 40 dB, more than 60 dB, between 20 dB and 100 dB, between 30 dB and 70 dB or any value or range of values within such ranges) at $\lambda_2$, where $\lambda_2$ may be the optical wavelength of an I/O optical signal during the regular operation of PIC 701. $\lambda_2$ may be a range, or multiple ranges, or wavelengths in some embodiments. Similarly, $\lambda_1$ may be a range of wavelengths. In some embodiments, optical filter 717 may comprise a multi-mode optical filter. In some embodiments, optical filter 717 may comprise a resonant filter. In some embodiments, optical filter 717 may comprise a Mach-Zehnder filter. However, any suitable type of optical filter configured to provide low optical loss at $\lambda_1$ and high optical loss at $\lambda_2$ may be employed. Optical wavelengths $\lambda_1$ and $\lambda_2$ may be separated by an optical bandwidth that is greater than 1 nm in some embodiments, greater than 5 nm in some embodiments, greater than 10 nm in some embodiments, greater than 30 nm in some embodiments, greater than 50 nm in some embodiments, greater than 75 nm in some embodiments, greater than 100 nm in some embodiments, between 10 nm and 100 nm, or any value or range of values within such ranges.

At $\lambda_1$, optical filter 717 may exhibit low optical loss and the signal coupled to optical waveguide 703 may be coupled to tap coupler 707. Tap coupler 707 may be a directional coupler configured to couple an optical power to waveguide $702_4$ that is between 1% and 10% of the optical power received by waveguide 703. The signal received by I/O optical waveguide $702_4$ may be provided to optical fiber $710_4$. The signal received by optical fiber $710_4$ may be used to monitor the status of the optical alignment. In some embodiments, the position of PIC 701 relative to optical fiber assembly 720 may be adjusted until the power of the signal received by optical fiber $710_4$ (as detected in the manner described previously in connection with FIG. 3, or in any other suitable manner) is maximized. In some embodiments, by optically aligning the two outermost I/O optical waveguides $702_1$ and $702_4$ to the two outermost optical fibers $710_1$ and $710_4$, the inner waveguides $702_2$ and $702_3$ may be naturally self-aligned to optical fibers $710_2$ and $710_3$. However the application is not limited in this respect, and I/O optical waveguides other than the two outermost optical waveguides may be used for the purpose of optical alignment. In some embodiments one outermost waveguide (such as waveguide $702_1$) and one non-outermost waveguide (such as waveguide $702_3$) may be used for the purpose of optical alignment. In some embodiments, two interior waveguides may be used.

Figure 8A:
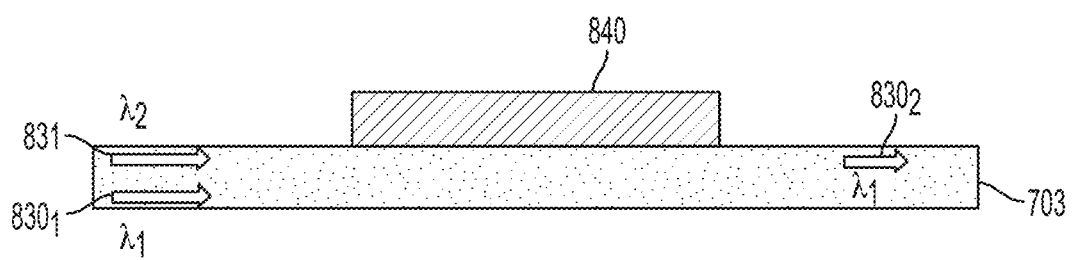
FIG. 8A is a side view of a germanium absorption element, according to a non-limiting embodiment of the present application.
Figure 8B:
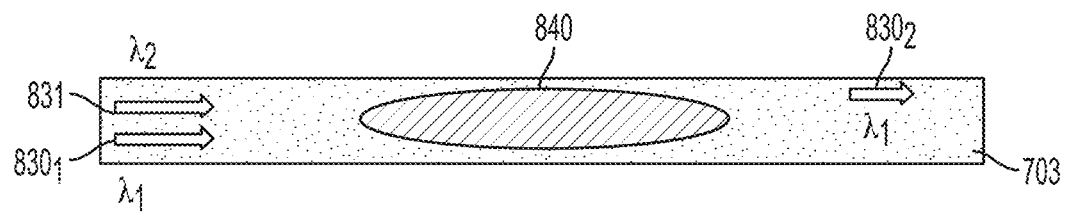
FIG. 8B is a top view of the germanium absorption element of FIG. 8A, according to a non-limiting embodiment of the present application.

In some embodiments, optical filter 717 may comprise a germanium absorption element. FIG. 8A and FIG. 8B are a side view and a top view, respectively, of a germanium absorption element, according to a non-limiting embodiment of the present application. A germanium layer 840 may be deposited on top of a portion of optical waveguide 703. In some embodiments germanium layer 840 may comprise pure germanium. In other embodiments, germanium layer 840 may comprise a silicon/germanium alloy. Germanium layer 840 may be deposited or grown in any suitable way. By way of example and not limitation, germanium layer 840 may be epitaxially grown. In some embodiments optical waveguide 703 may comprise a taper to facilitate coupling of light to and from the germanium layer. In some embodiments, germanium layer 840 may comprise tapers to facilitate coupling of light to and from optical waveguide 703.

The germanium layer may be configured to absorb, at least in part, optical signals having wavelength $\lambda_2$ while being transparent, at least in part, to optical signals having wavelength $\lambda_1$. An optical signal 831, propagating along waveguide 703 and having a wavelength $\lambda_2$ less than the germanium cutoff wavelength, may be absorbed by germanium layer 840. By way of example and not limitation, the germanium layer may have a cutoff wavelength that is between 1560 nm and 1575 nm. Optical signal 831 may be suppressed by more than 20 dB, more than 30 dB, more than 40 dB, more than 60 dB, between 20 dB and 100 dB, between 30 dB and 70 dB or any value or range of values within such ranges.

An optical signal $830_1$, propagating along waveguide 703 and having a wavelength $\lambda_1$ greater than the germanium cutoff wavelength, may propagate through germanium layer 840 without experiencing significant optical loss. Because the refractive index of germanium is high, some light may be coupled to the Ge layer, but generally the amount will be small due to lack of phase matching. In some embodiments, optical signal $830_2$, obtained by transmitting optical signal $830_1$ through germanium layer 840, may experience a loss of less than 10 dB, less than 6 dB, less than 3 dB, or any value or range of values within such ranges, while propagating through the germanium. As shown in FIG. 8B, germanium layer 840 may be patterned to form any suitable desired shape. For example, germanium layer 840 may be patterned to form a rectangular shape. In some embodiments, germanium layer 840 may be further patterned to form rounded vertices. The shape may be configured to facilitate optical coupling at $\lambda_1$.

Figure 9:
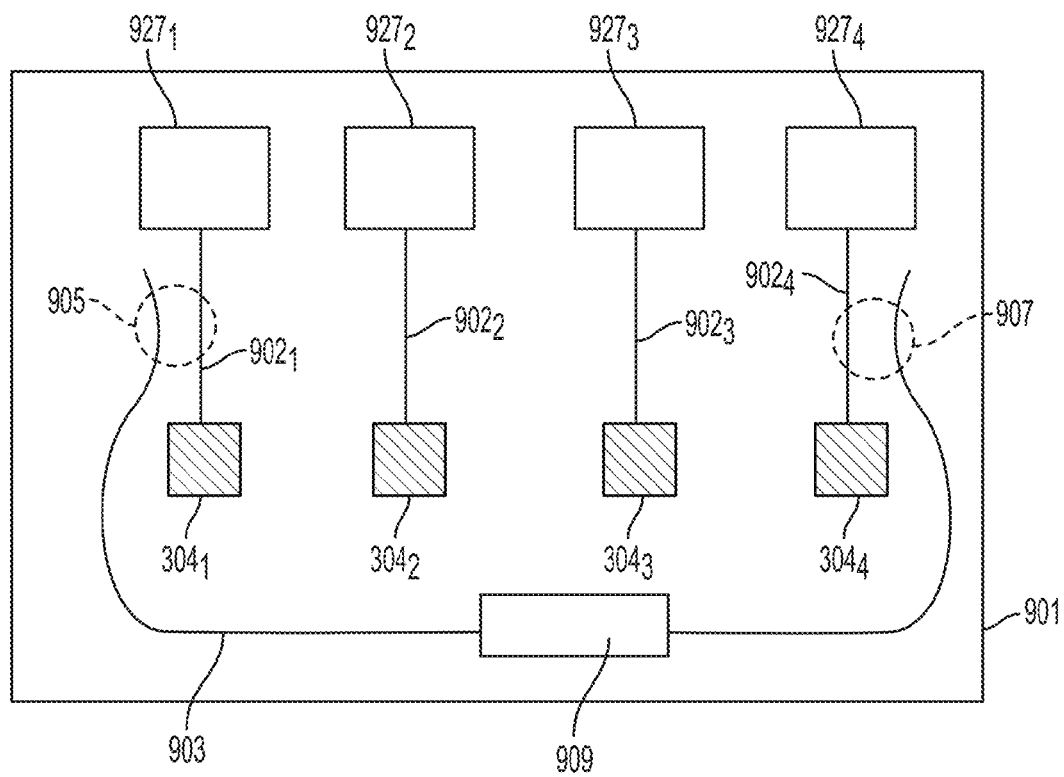
FIG. 9 is a top view of a PIC comprising a plurality of grating couplers and two tap couplers coupled by an optical waveguide having an optical impedance element, according to a non-limiting embodiment of the present application.

FIG. 9 is a top view of a PIC 901 comprising a plurality of grating couplers $927_1$, $927_2$, $927_3$, $927_4$ and two tap couplers 905 and 907 coupled by an optical waveguide 903 having an optical impedance element 909, according to a non-limiting embodiment of the present application. I/O optical waveguides $902_1$, $902_2$, $902_3$ and $902_4$ may be respectively coupled to grating coupler $927_1$, $927_2$, $927_3$ and $927_4$. I/O optical waveguides $902_1$ ... $902_4$ may serve as I/O optical waveguides 102 of FIG. 1. Grating couplers $927_1$ ... $927_4$ may be configured to be coupled to respective optical fibers (not shown). Optical waveguides $902_1$ ... $902_4$ may be coupled to optical components $304_1$ ... $304_4$ respectively. Each of the optical components $304_1$ ... $304_4$ may represent any suitable type of optical component, such as a photodetector, filter, modulator, switch, polarization splitter, polarization rotator, etc. The optical fibers may be disposed in a package. In some embodiments, the propagation axes of the optical fibers may be parallel to the normal to the top surface of PIC 901. In some embodiments, the propagation axes of the optical fibers may form angles with respect to the normal to the top surface of PIC 901 that are less than 10°. While the non-limiting embodiment of FIG. 9 illustrates four I/O optical waveguides and four grating couplers, the application is not limited in this respect and any suitable number of I/O optical waveguides and grating couplers may be used.

In the non-limiting embodiment shown in FIG. 9, an alignment signal may be provided to I/O optical waveguide $902_1$ by grating coupler $927_1$. I/O optical waveguide $902_1$ may be coupled to tap coupler 905. Tap coupler 905 may be a directional coupler configured to couple an optical power to waveguide 903 that is between 1% and 10% of the optical power received by I/O optical waveguide $902_1$, and/or may couple a different polarization. The optical signal received by waveguide 903 may be coupled to optical impedance element 909.

In some embodiments, optical impedance element 909 may comprise one or more optical switches of the type described in connection with FIG. 5. In other embodiments, optical impedance element 909 may comprise one or more breakable optical waveguides of the type described in connection with FIG. 6A and FIG. 6B. In yet other embodiments, optical impedance element 909 may comprise one or more optical filters of the type described in connection with FIG. 7.

During optical alignment, optical impedance element 909 may exhibit low optical loss and the signal coupled to optical waveguide 903 may be coupled to tap coupler 907. Tap coupler 907 may be a directional coupler configured to couple an optical power to waveguide $902_4$ that is between 1% and 10% of the optical power received by waveguide 903, and/or may couple a different polarization. The signal received by I/O optical waveguide $902_4$ may be provided to an optical fiber via grating coupler $927_4$. The signal received by the optical fiber may be used to monitor the status of the optical alignment. In some embodiments, the position of PIC 901 relative to the array of optical fibers may be adjusted until the power of the signal received is maximized. In some embodiments, by optically aligning the two outermost I/O optical waveguides $902_1$ and $902_4$ to the two outermost optical fibers (not shown), the inner waveguides $902_2$ and $902_3$ may be naturally self-aligned to the inner optical fibers. However the application is not limited in this respect, and I/O optical waveguides other than the two outermost optical waveguides may be used for the purpose of optical alignment. In some embodiments one outermost waveguide (such as waveguide $902_1$) and one non-outermost waveguide (such as waveguide $902_3$) may be used for the purpose of optical alignment. In some embodiments, two interior waveguides may be used.

Figure 10:
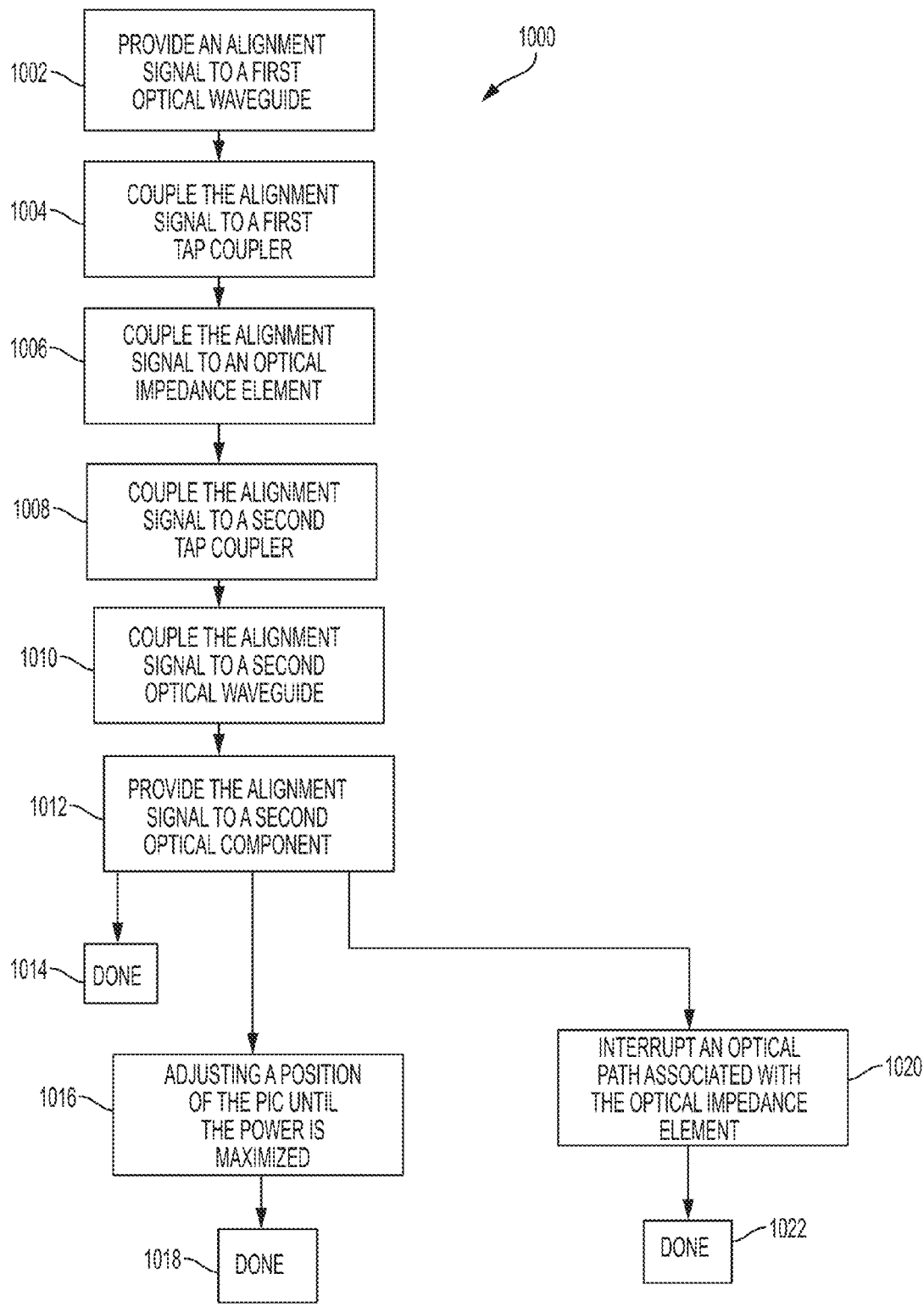
FIG. 10 illustrates the steps of a method for optically aligning a plurality of I/O optical waveguides to a plurality of optical components, according to a non-limiting embodiment of the present application.

FIG. 10 illustrates the steps of a method for optically aligning a plurality of optical waveguides to a plurality of optical components, according to a non-limiting embodiment of the present application. Method 1000 begins at act 1002, where an alignment signal may be provided to a PIC (such as PIC 401, 501, 601, 701 or 901). The alignment signal may be a continuous wave (CW) optical signal in some embodiments. The alignment signal may be provided by a first optical component comprising an optical fiber or an I/O optical waveguide of another PIC. In some embodiments, the alignment signal may be coupled to a first I/O optical waveguide that is also used during the regular operation of the PIC. By way of example and not limitation, the I/O optical waveguide may be a transmit (TX) optical waveguide, a receive (RX) optical waveguide, or an optical waveguide by which an external laser may be coupled to the PIC. In some embodiments, the alignment signal may be coupled to an outermost I/O optical waveguide of an optical waveguide array (such as I/O optical waveguide $402_1$, $502_1$, $602_1$, $702_1$ or $902_1$). However the application is not limited in this respect and any inner waveguide may otherwise be used to couple the alignment signal to the PIC.

At act 1004, the alignment signal coupled to the I/O waveguide may be further coupled to a first tap coupler (such as tap coupler 405, 505, 605, 705 or 905). The tap coupler may be a directional coupler configured to couple an optical power to an optical waveguide (such as optical waveguide 403, 503, 603, 703 or 903) that is between 1% and 10% of the optical power received by the first I/O optical waveguide.

At act 1006, the alignment signal may be coupled to one or more optical impedance elements. In some embodiments, the optical impedance elements may comprise one or more optical switches such as optical switch 513. The optical switch(es) may be configured to provide low optical loss (e.g., less than 6 dB, less than 3 dB, less than 2 dB, less than 1 dB, or any value or range of values within such ranges) to the alignment signal and high optical loss (e.g., more than 20 dB, more than 30 dB, more than 40 dB, more than 60 dB, between 20 dB and 100 dB, between 30 dB and 70 dB or any value or range of values within such ranges) during the regular operation of the PIC.

In other embodiments, the optical impedance elements may comprise one or more optical waveguides exhibiting breakable regions such as breakable region 609 of optical waveguide 603. As discussed in connection with FIG. 6A and FIG. 6B, optical waveguide 603 may be disrupted once optical alignment has been achieved. The disruption may be obtained through the application of mechanical pressure. After the application of a mechanical pressure, the optical path associated with waveguide 603 may be interrupted. In some embodiments, the interruption may be permanent. The interruption may cause an optical loss that is greater than 20 dB in some embodiments, greater than 30 dB in some embodiments, greater than 40 dB in some embodiments, greater than 60 dB in some embodiments, between 20 dB and 100 dB, between 30 dB and 70 dB or any value or range of values within such ranges. In other embodiments, interruption of optical waveguide 603 may be performed by disposing an absorbing material on the top surface of the PIC.

In yet other embodiments, the optical impedance elements may comprise one or more optical filters such as optical filter 717. The optical filter(s) may be configured to provide low optical loss (e.g., less than 6 dB, less than 3 dB, less than 2 dB, less than 1 dB, or any value or range of values within such ranges) at $\lambda_1$, where $\lambda_1$ is the optical wavelength of the alignment signal, and high optical loss (e.g., more than 20 dB, more than 30 dB, more than 40 dB, more than 60 dB, between 20 dB and 100 dB, between 30 dB and 70 dB or any value or range of values within such ranges) at $\lambda_2$, where $\lambda_2$ is the optical wavelength of an I/O optical signal during the regular operation of the PIC.

At act 1008, the alignment signal may be coupled to a second tap coupler (such as tap coupler 407, 507, 607, 707 or 907).

At act 1010, the second tap coupler may couple the alignment signal to a second I/O optical waveguide. The second tap coupler may be a directional coupler configured to couple an optical power to the second I/O optical waveguide that is between 1% and 10% of the optical power received. In some embodiments, the alignment signal may be coupled to an I/O optical waveguide that is used for the regular operation of the PIC. By way of example and not limitation, the I/O optical waveguide may be a transmit (TX) optical waveguide, a receive (RX) optical waveguide, or an optical waveguide by which an external laser is coupled to the PIC. In some embodiments, the alignment signal may be coupled to an outermost I/O optical waveguide of an optical waveguide array (such as I/O optical waveguide $402_4$, $502_4$, $602_4$, $702_4$ or $902_4$). However the application is not limited in this respect and any inner waveguide may otherwise be used to couple the alignment signal to the PIC.

At act 1012, the signal received by the second I/O optical waveguide may be provided to a second optical component. The second optical component may comprise an optical fiber or an I/O optical waveguide of another PIC. The signal received by the second optical component may be used to monitor the status of the optical alignment.

In some embodiments, method 1000 may end at act 1014.

In some embodiments, the method may continue to act 1016, where the position of the PIC relative to the optical components may be adjusted until the power of the signal received by the second optical component is maximized, or otherwise reaches a level indicating sufficient alignment. That is, sufficient alignment in the embodiments described herein may not require the power to be maximum, but rather above a desired threshold in some embodiments. Method 1000 may end at act 1018, in some embodiments.

In some embodiments, the method may continue to act 1020, where the optical path associated to the optical impedance element may be disrupted. For example, optical waveguide 603 may be interrupted in correspondence to breakable region 609. Method 1000 may end at act 1022, in some embodiments.

Aspects of the present application may provide one or more benefits, some of which have been previously described. Now described are some non-limiting examples of such benefits. It should be appreciated that not all aspects and embodiments necessarily provide all of the benefits now described. Further, it should be appreciated that aspects of the present application may provide additional benefits to those now described.

Aspects of the present application allow for optical alignment of a PIC to a plurality of optical components (e.g., an optical fiber array) without using dedicated I/O optical waveguides, which may require additional space on the PIC and/or on the package where the PIC is disposed. Due to the space saved on the PIC and/or on the package, production costs may be decreased.

Aspects of the present application allow for optical alignment of a PIC to a plurality of optical components (e.g., an optical fiber array) using non-dedicated I/O optical waveguides, without causing optical crosstalk between said I/O optical waveguides during the regular operation of the PIC.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

In the claims, as well as in the specification above, all transitional phrases such as "comprising," "including," "carrying," "having," "containing," "involving," "holding," "composed of," and the like are to be understood to be open-ended, i.e., to mean including but not limited to. The transitional phrases "consisting of" and "consisting essentially of" shall be closed or semi-closed transitional phrases, respectively.

What is claimed is:

1. A photonic integrated circuit comprising:
    a first optical waveguide and a second optical waveguide, the first optical waveguide having a first end adjacent a side of the photonic integrated circuit and the second optical waveguide having a second end adjacent the side of the photonic integrated circuit;
    a first tap coupler coupled to the first waveguide;
    a second tap coupler coupled to the second waveguide;
    wherein the first tap coupler is coupled to the second tap coupler by a waveguide having an optical impedance element.

2. The photonic integrated circuit of claim 1, wherein the optical impedance element comprises an optical filter.

3. The photonic integrated circuit of claim 2, wherein the optical filter comprises a multimode optical filter.

4. The photonic integrated circuit of claim 2, wherein the optical filter comprises a germanium absorption element.

5. The photonic integrated circuit of claim 1, wherein the optical impedance element comprises a variable optical attenuator.

6. The photonic integrated circuit of claim 1, wherein the first end of the first optical waveguide is tapered and the second end of the second optical waveguide is tapered.

7. The photonic integrated circuit of claim 1, wherein the first end of the first optical waveguide is coupled to a first grating coupler and the second end of the second optical waveguide is coupled to a second grating coupler.

8. The photonic integrated circuit of claim 1, wherein the first end of the first optical waveguide is coupled to a first photodetector and the second end of the second optical waveguide is coupled to a second photodetector.

9. The photonic integrated circuit of claim 1, comprising three or more optical waveguides having respective ends adjacent the side of the photonic integrated circuit, the three or more optical waveguides including the first optical waveguide and the second optical waveguide, wherein the first optical waveguide is an outermost optical waveguide of the three or more optical waveguides.

10. The photonic integrated circuit of claim 9, wherein the second optical waveguide is an outermost optical waveguide of the three or more optical waveguides.

11. The photonic integrated circuit of claim 1, wherein the first optical waveguide, the second optical waveguide, the first tap coupler, the second tap coupler and the waveguide coupling the first tap coupler and the second tap coupler are disposed on a silicon substrate.

12. The photonic integrated circuit of claim 1, wherein the first end of the first optical waveguide is coupled to a first optical fiber and the second end of the second optical fiber is coupled to a second optical fiber.

13. A method for optically aligning a plurality of optical waveguides disposed on a photonic integrated circuit to a plurality of optical components, the method comprising:
    providing an alignment signal to a first optical waveguide of the plurality of optical waveguides with a first optical component of the plurality of optical components through a side of the photonic integrated circuit;
    providing the alignment signal from the first optical waveguide to a second optical waveguide of the plurality of optical waveguides via first and second tap couplers and an optical impedance element; and
    providing the alignment signal to a second optical component of the plurality of optical components with the second optical waveguide of the plurality of optical waveguides through the side of the photonic integrated circuit.

14. The method of claim 13, further comprising adjusting a position of the photonic integrated circuit relative to the plurality of optical components until an optical power, associated with the alignment signal provided to the second optical element of the plurality of optical elements, achieves a threshold.

15. The method of claim 13, further comprising interrupting an optical path, associated with the optical impedance element, once the plurality of optical waveguides are optically aligned to the plurality of optical components.

16. The method of claim 15, wherein interrupting the optical path associated with the optical impedance element comprises disrupting the optical impedance element.

17. The method of claim 13, wherein the alignment signal has a first optical wavelength and the photonic integrated circuit is configured to receive, once the plurality of optical waveguides are optically aligned to the plurality of optical components, an optical signal having a second optical wavelength, and
    wherein the first optical wavelength and the second optical wavelength are separated by an optical bandwidth that is greater than 10 nm.

18. The method of claim 13, wherein providing the alignment signal to the first optical waveguide comprises edge coupling the alignment signal to the first optical waveguide and providing the alignment signal to the second optical component comprises edge coupling the alignment signal to the second optical component.

19. The method of claim 13, wherein providing the alignment signal to the first optical waveguide comprises coupling the alignment signal to the first optical waveguide with a first grating coupler and providing the alignment signal to the second optical component comprises coupling the alignment signal to the second optical component with a second grating coupler.

20. The method of claim 13, wherein the plurality of optical components comprises an optical fiber array.

21. The method of claim 13, wherein the optical fiber array is disposed on an optical fiber assembly.

* * * * *